US008430005B2

(12) United States Patent
Gass et al.

(10) Patent No.: US 8,430,005 B2
(45) Date of Patent: Apr. 30, 2013

(54) MITER SAW WITH IMPROVED SAFETY SYSTEM

(75) Inventors: Stephen F. Gass, West Linn, OR (US); J. David Fulmer, West Linn, OR (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 13/373,613

(22) Filed: Nov. 21, 2011

(65) Prior Publication Data

US 2012/0137848 A1 Jun. 7, 2012

Related U.S. Application Data

(60) Division of application No. 12/661,993, filed on Mar. 26, 2010, now Pat. No. 8,061,246, which is a division of application No. 11/982,972, filed on Nov. 5, 2007, now Pat. No. 7,685,912, which is a division of application No. 10/932,339, filed on Sep. 1, 2004, now Pat. No. 7,290,472, which is a continuation of application No. 10/047,066, filed on Jan. 14, 2002, now Pat. No. 6,945,148, and a continuation of application No. 10/050,085, filed on Jan. 14, 2002, now abandoned.

(51) Int. Cl.
*B23D 59/00* (2006.01)
*B23D 45/04* (2006.01)
*B26D 7/22* (2006.01)

(52) U.S. Cl.
USPC .......... 83/62.1; 83/477.2; 83/490; 83/DIG. 1; 83/471.3; 83/397.1; 83/581

(58) Field of Classification Search .................. 83/62.1, 83/477.1, 397.1, DIG. 1, 581, 666, 72, 471.3, 83/62, 473, 488, 490, 50, 76.7, 48.1, 471.2, 83/485, 489, 574, 84, 823, 827, 826, 954, 83/481, 665, 522, 544, 476, 526, 768, 546
See application file for complete search history.

(56) References Cited

U.S. PATENT DOCUMENTS

| | | | | |
|---|---|---|---|---|
| 2,392,486 | A | 1/1946 | Larsen | |
| 2,434,174 | A | 1/1948 | Morgan | |
| 2,722,246 | A | 11/1955 | Arnoldy | |
| 2,785,710 | A * | 3/1957 | Mowery, Jr. | 83/68 |

(Continued)

FOREIGN PATENT DOCUMENTS

| | | |
|---|---|---|
| DE | 2917497 | 4/1979 |
| DE | 3427733 | 1/1986 |
| DE | 19609771 | 6/1998 |
| GB | 2142571 | 1/1985 |

OTHER PUBLICATIONS

*You Should Have Invented It*, French television show DVD.

*Primary Examiner* — Ghassem Alie

(57) ABSTRACT

Miter saws are disclosed having a base, a blade supported by the base, a detection system adapted to detect a dangerous condition between a person and the blade, and a reaction system associated with the detection system to cause a predetermined action to take place upon detection of the dangerous condition. The blade is rotatable, and moves into a cutting zone to cut a workpiece. The predetermined action may be to stop the blade from rotating, to create an impulse against movement of the blade into the cutting zone, or to cause the blade to move away from the cutting zone. The reaction system may include a brake member coupled to a housing.

1 Claim, 13 Drawing Sheets

U.S. PATENT DOCUMENTS 2,876,809 A 3/1959 Rentsch et al.
3,224,474 A 12/1965 Bloom
3,613,748 A 10/1971 De Pue
3,621,894 A 11/1971 Niksich
3,785,230 A 1/1974 Lokey
3,805,639 A 4/1974 Peter
3,829,970 A 8/1974 Anderson
3,858,095 A 12/1974 Friemann et al.
3,922,785 A 12/1975 Fushiya
3,974,565 A 8/1976 Ellis
4,026,177 A 5/1977 Lokey
4,106,378 A 8/1978 Kaiser
4,117,752 A 10/1978 Yoneda
4,145,940 A 3/1979 Woloveke et al.
4,200,002 A 4/1980 Takahashi
4,453,112 A 6/1984 Sauer et al.
4,466,170 A 8/1984 Davis
4,466,233 A 8/1984 Thesman
4,512,224 A 4/1985 Terauchi
4,518,043 A 5/1985 Anderson et al.
4,527,453 A 7/1985 van Hauten
4,560,033 A 12/1985 DeWoody et al.
5,086,890 A 2/1992 Turczyn et al.
5,199,343 A 4/1993 O'Banion
5,353,670 A 10/1994 Metzger, Jr.
5,623,860 A 4/1997 Schoene et al.
5,724,875 A 3/1998 Meredith et al.
5,737,986 A * 4/1998 Garuglieri ........................ 83/13
5,782,001 A 7/1998 Gray
6,336,273 B1 1/2002 Nilsson et al.
6,742,430 B2 6/2004 Chen
6,874,397 B2 4/2005 Chang
6,874,399 B2 4/2005 Lee
6,945,148 B2 9/2005 Gass et al.
2002/0017175 A1 2/2002 Gass et al.
2002/0056348 A1* 5/2002 Gass et al. ..................... 83/62.1
2003/0037655 A1* 2/2003 Chin-Chin ...................... 83/397
2004/0060404 A1 4/2004 Metzger, Jr.
2004/0159198 A1 8/2004 Peot et al.
2004/0194594 A1 10/2004 Dils et al.
2004/0200329 A1 10/2004 Sako
2004/0226424 A1 11/2004 O'Banion et al.
2005/0092149 A1 5/2005 Hartmann

* cited by examiner

MITER SAW WITH IMPROVED SAFETY SYSTEM

CROSS-REFERENCE TO RELATED APPLICATIONS

This application is a divisional claiming the benefit U.S. patent application Ser. No. 12/661,993, filed Mar. 26, 2010, issuing as U.S. Pat. No. 8,061,246 on Nov. 22, 2011, which in turn is a divisional of U.S. patent application Ser. No. 11/982,972, filed Nov. 5, 2007, now U.S. Pat. No. 7,685,912, which in turn is a divisional of U.S. patent application Ser. No. 10/932,339, filed Sep. 1, 2004, now U.S. Pat. No. 7,290,472, which in turn is a continuation of U.S. patent application Ser. No. 10/047,066, filed Jan. 14, 2002, now U.S. Pat. No. 6,945,148, and U.S. patent application Ser. No. 10/050,085, filed Jan. 14, 2002, now abandoned.

FIELD

The present invention relates to miter saws, and more particularly to miter saws with high-speed safety systems.

BACKGROUND

Miter saws are a type of woodworking machinery used to cut workpieces of wood, plastic and other materials. Miter saws typically include a base upon which workpieces are placed and include a circular saw blade mounted on a pivot arm. A person uses a miter saw by placing a workpiece on the base beneath the upraised blade and then bringing the blade down via the pivot arm to cut the workpiece. Miter saws present a risk of injury to users because the spinning blade is often exposed when in use. Furthermore, users often use their hands to position and support workpieces beneath the blade, which increases the chance that an injury will occur.

The present invention provide miter saws with improved safety systems that are adapted to detect the occurrence of one or more dangerous, or triggering, conditions during use of the miter saw, such as when a user's body contacts the spinning saw blade. When such a condition occurs, a safety system is actuated to limit or even prevent injury to the user.

DETAILED DESCRIPTION

Figure 1:
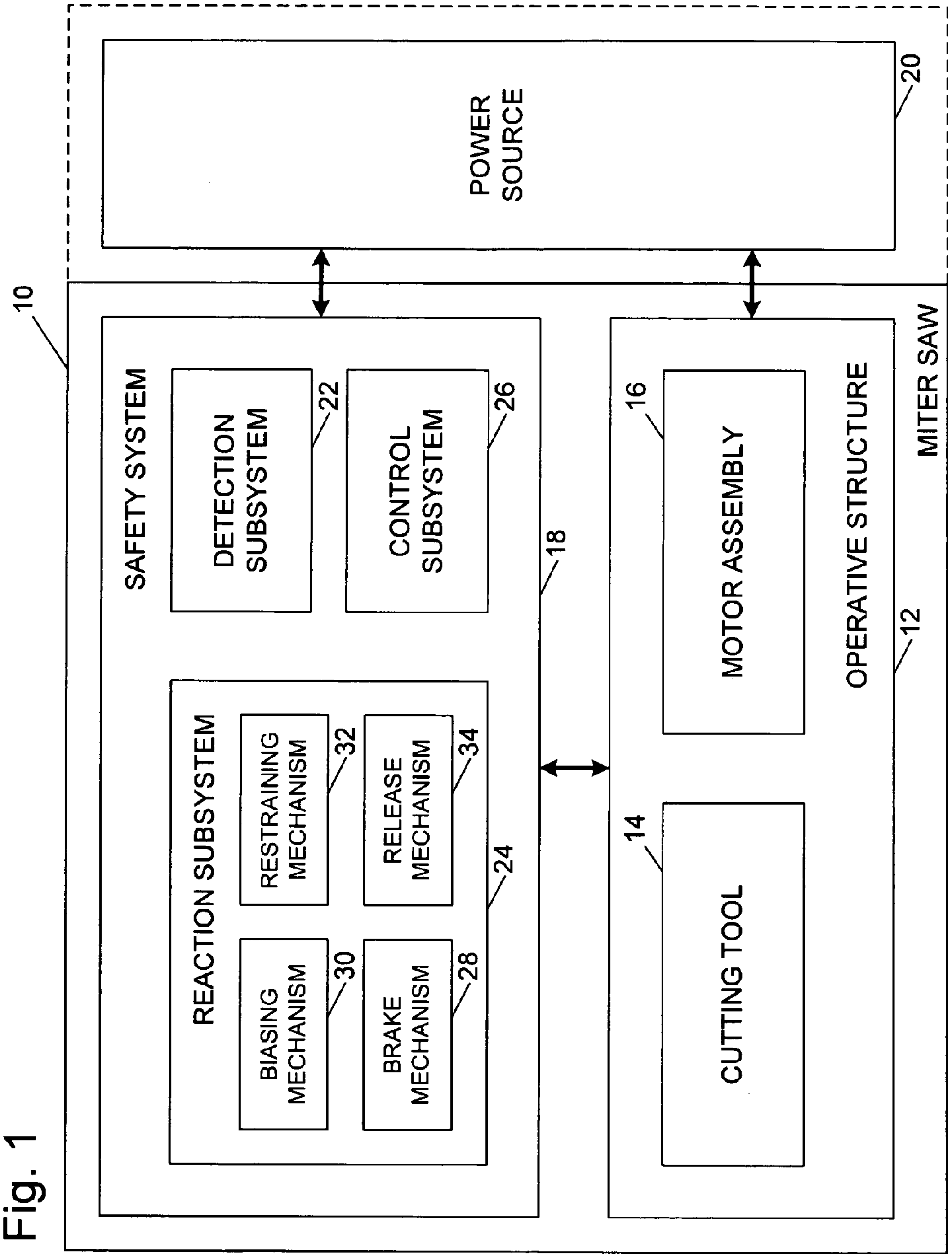
FIG. 1 is a schematic block diagram of a miter saw with a fast-acting safety system according to the present invention.

A miter saw according to the present invention is shown schematically in FIG. 1 and indicated generally at 10. Miter saw 10 may be any of a variety of different types and configurations of miter saw adapted for cutting workpieces, such as wood, plastic, etc. Miter saw 10 includes an operative structure 12 having a cutting tool 14 and a motor assembly 16 adapted to drive the cutting tool. Miter saw 10 also includes a safety system 18 configured to minimize the potential of a serious injury to a person using miter saw 10. Safety system 18 is adapted to detect the occurrence of one or more dangerous, or triggering, conditions during use of miter saw 10. If such a dangerous condition is detected, safety system 18 is adapted to engage operative structure 12 to limit any injury to the user caused by the dangerous condition.

Miter saw 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of miter saw 10.

It will be appreciated that operative structure 12 may take any one of many different forms, depending on the type of miter saw 10. As will be described in more detail below, operative structure 12 typically takes the form of an arm pivotally coupled to a base. Cutting tool 14 is mounted on the arm and pivotal toward a workpiece supported by the base. Alternatively, the arm may be both pivotally and slidably coupled to the base.

Motor assembly 16 includes one or more motors adapted to drive cutting tool 14. The motors may be either directly or indirectly coupled to the cutting tool. Typically, motor assembly 16 is mounted on the pivot arm and directly coupled to the cutting tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of miter saw 10. In addition, control subsystem 26 typically includes one or more instruments operable by a user to control the miter saw. The control subsystem is configured to control miter saw 10 in response to the inputs it receives.

Detection subsystem 22 is configured to detect one or more dangerous, or triggering, conditions during use of miter saw 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 and U.S.

patent application Ser. No. 09/676,190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of miter saw 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000 and U.S. patent application Ser. No. 09/929, 226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929, 242, filed Aug. 13, 2001, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of miter saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
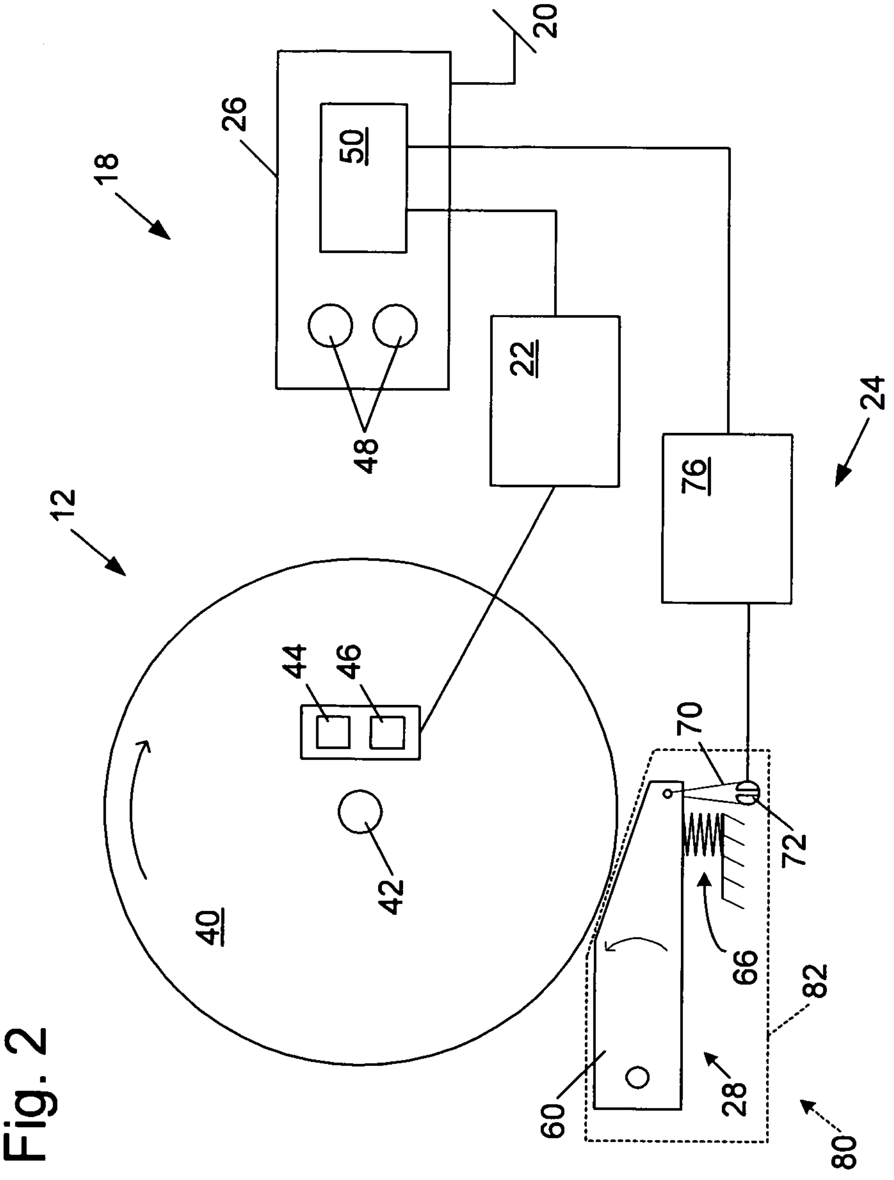
FIG. 2 is a schematic diagram of an exemplary safety system configured to stop the miter saw blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of miter saw 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, brake mechanism 28 is adapted to engage the teeth of blade 40 and stop rotation of the blade.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of miter saw 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. patent application Ser. No. 09/929,426, filed Aug. 13, 2001, U.S. Provisional Patent Application Ser. No. 60/225, 211, filed Aug. 14, 2000, U.S. patent application Ser. No. 09/929,221, filed Aug. 13, 2001 and U.S. Provisional Patent Application Ser. No. 60/270,011, filed Feb. 20, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000 and U.S. patent application Ser. No. 09/929,234, filed Aug. 13, 2001, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW), Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism such as a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately 1/32-inch to 1/4-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. patent application Ser. No. 09/929,240, filed Aug. 13, 2001, U.S. Provisional Patent Application Ser. No. 60/225,170, filed Aug. 14, 2000, U.S. patent application Ser. No. 09/929,227, filed Aug. 13, 2001, U.S. Provisional Patent Application Ser. No. 60/225,169, filed Aug. 14, 2000 and U.S. patent application Ser. No. 09/929,241, filed Aug. 13, 2001, the disclosures of which are herein incorporated by reference.

It will be appreciated that activation of the brake mechanism may require the replacement of one or more portions of safety system 18. For example, pawl 60 and fusible member 70 typically are single-use components which must be replaced before the safety system is ready to be used again. Thus, it may be desirable to incorporate one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, U.S. patent application Ser. No. 09/929,236, filed Aug. 13, 2001, U.S. Provisional Patent Application Ser. No. 60/225,212, filed Aug. 14, 2000 and U.S. patent application Ser. No. 09/929,244, filed Aug. 13, 2001, the disclosures of which are herein incorporated by reference.

In the exemplary embodiment illustrated in FIG. 2, reaction subsystem 24 is configured to act on cutting tool 14 and stop rotation of blade 40. As mentioned above, reaction subsystem 24 may be configured also to act on a different portion of operative structure 12 to stop and/or reverse the translation of blade 40 toward the workpiece and the user's body. Otherwise, the blade may continue to move toward the user's body even though the blade has stopped rotating. For example, U.S. Provisional Patent Application Ser. No. 60/270,941, filed Feb. 22, 2001, U.S. Provisional Patent Application Ser. No. 60/270,942, filed Feb. 22, 2001, U.S. Provisional Patent Application Ser. No. 60/273,178, filed Mar. 2, 2001 and U.S. Provisional Patent Application Ser. No. 60/273,902, filed Mar. 6, 2001, the disclosures of which are herein incorporated by reference, describe various alternative embodiments of reaction subsystem 24 configured to stop any downward movement of the miter saw blade and/or move the blade upward away from the workpiece and the user's body.

Figure 3:
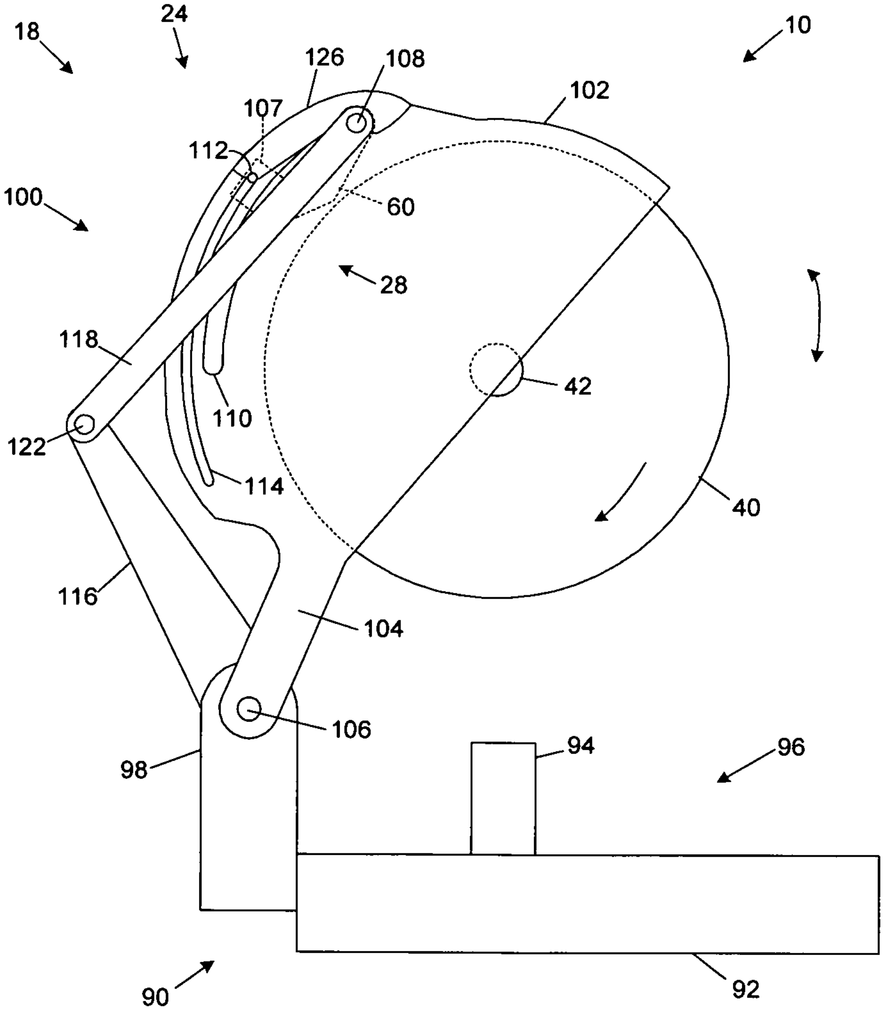
FIG. 3 is a schematic side elevation of an exemplary miter saw having a safety system configured to stop both the rotation and downward movement of the blade.
Figure 4:
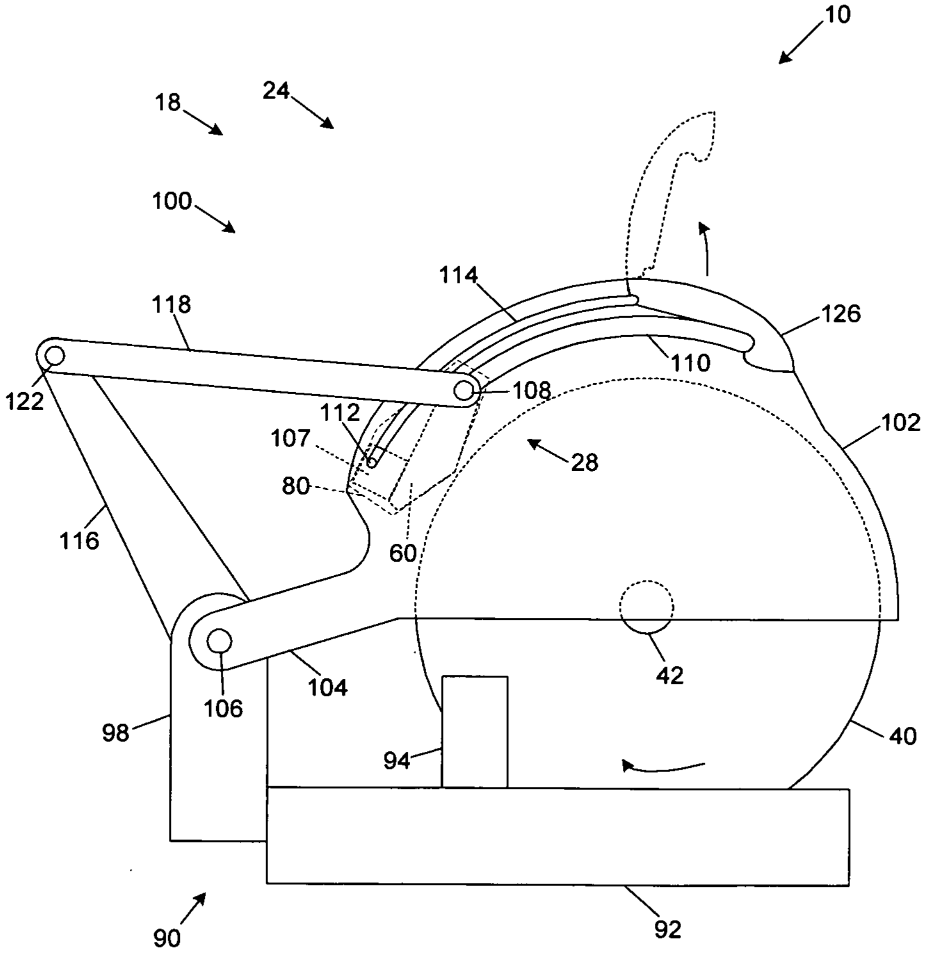
FIG. 4 is similar to FIG. 3 but shows the pivot arm assembly pivoted downward into the cutting zone.
Figure 5:
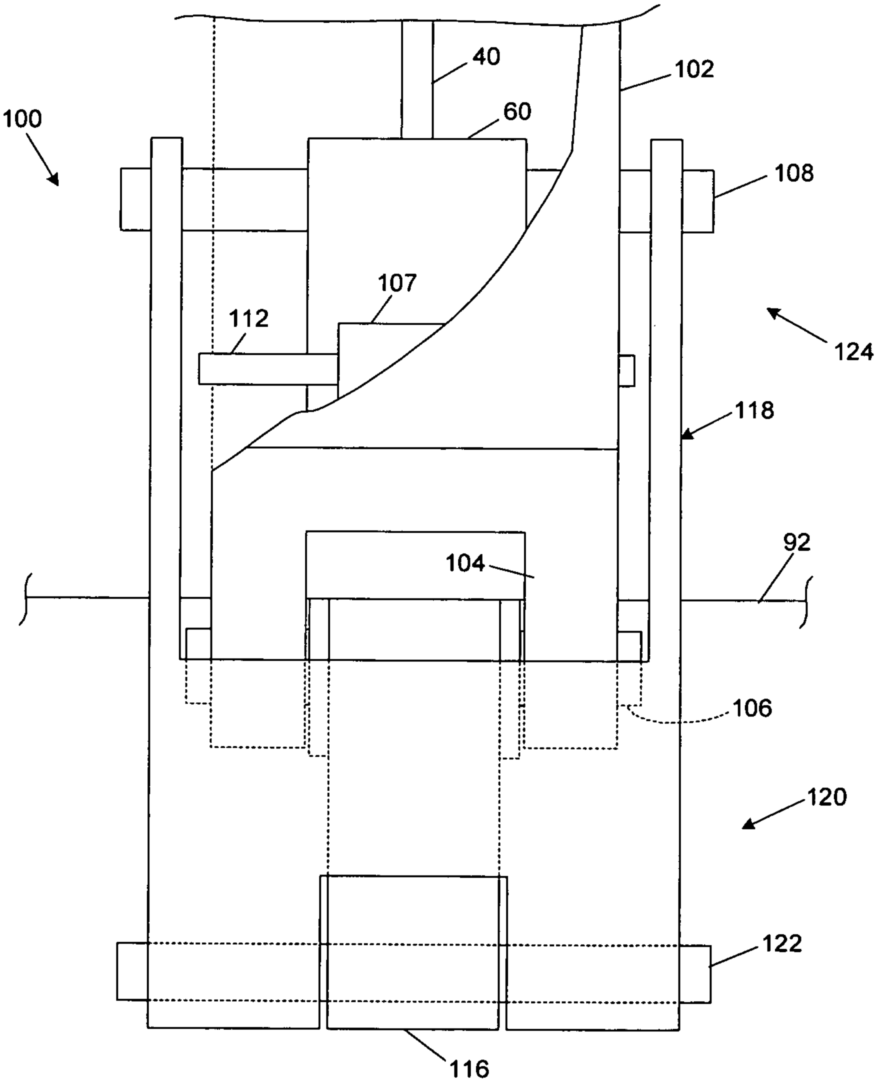
FIG. 5 is a partial top plan view of the miter saw of FIG. 3, with a portion of the housing cut away to show the brake pawl.

Turning attention now to FIGS. 3-5, another alternative embodiment is illustrated in which reaction subsystem 24 is configured to stop both the rotation and downward movement of the blade. Exemplary miter saw 10 includes a base assembly 90 having a base 92 adapted to support a workpiece during cutting. Typically, one or more fences 94 are mounted on base 92 and adapted to prevent workpieces from shifting across the base during cutting. Base 92 and fences 94 define a cutting zone 96 in which workpieces may be cut. Exemplary base assembly 90 also includes a tilt mechanism 98 coupled to base 92.

As in the embodiments described above, blade 40 is mounted on a rotatable arbor 42. The arbor is driven by a motor assembly (not shown) which is supported above base 92 by a pivot arm assembly 100. As shown in FIGS. 3 and 4, the pivot arm assembly is selectively pivotal toward and away from cutting zone 96 to cut workpieces with the blade. In addition, at least a portion of tilt mechanism 98 is selectively tiltable relative to base 92 to make beveled cuts in the workpiece.

Pivot arm assembly 100 includes a housing 102 extending outward from one end of an arm 104. The opposite end of arm 104 is connected to tilt mechanism 98 by a pivot coupling 106. Housing 102 is configured to extend at least partially around an upper portion of blade 40. Typically, pivot arm assembly 100 includes a spring or other biasing mechanism (not shown) adapted to maintain the housing and blade in a fully upward position away from cutting zone 96 when the miter saw is not in use.

Reaction subsystem 24 includes a brake mechanism 28 having at least one brake pawl 60 engageable by an actuator 107. The actuator typically includes a restraining mechanism adapted to hold the brake pawl away from the blade against the urging of a biasing mechanism. In response to an activation signal, a release mechanism within the actuator releases the brake pawl from the restraining mechanism to pivot into the blade, usually stopping the blade within approximately 2-5 milliseconds. Optionally, brake pawl 60 and/or one or more components of actuator 106 may be contained in a replaceable cartridge, such as indicated at 80 in FIG. 4. Exemplary actuators, restraining mechanisms, biasing mechanisms, release mechanisms, cartridges and brake pawls are described in more detail above and in the incorporated references.

Brake pawl 60 is mounted on a movable pivot pin 108 configured to slide within a first set of channels 110 in either side of housing 102. First set of channels 110 define concentric arcs about arbor 42. As a result, pivot pin 108 is maintained at a constant radius from the arbor as it slides within the first set of channels. A positioning pin 112 extends from one or both sides of actuator 106 to slide within a second set of channels 114. The second set of channels also define concentric arcs about arbor 42 so that positioning pin 112 maintains a constant radius from the arbor as it slides within the second set of channels. Since brake pawl 60 is coupled to actuator 112, both the brake pawl and actuator are maintained in a constant orientation relative to the arbor and the perimeter of the blade as pivot pin 108 slides within first set of channels 110.

As shown in FIG. 5, brake pawl 60 is laterally positioned on pivot pin 108 so that a central portion of the brake pawl is aligned with the blade. Brake mechanism 28 may include suitable positioning structure to maintain the brake pawl aligned with the blade. For example, annular spacers may be placed on pivot pin 108 on either side of the brake pawl to butt against the inner sides of housing 102. Alternatively, the brake pawl may be constructed to have a width substantially equal to the inner width of the housing. In alternative embodiments where cartridge 80 is used, the cartridge may be sized to extend substantially from one inner side of the housing to the other. As a further alternative, the inner sides of the housing may include projections which extend inward to center the cartridge or brake pawl relative to the blade.

Base assembly 90 also includes a brace member 116 extending upward from tilt mechanism 98. In the exemplary embodiment, brace member 116 extends upward from the tilt mechanism at an angle away from pivot arm assembly 100 so that the pivot arm assembly is not obstructed from pivoting to a fully raised position, as illustrated in FIG. 3. It will be appreciated that brace member 116 and tilt mechanism 98 may be formed as an integral, unitary structure. Alternatively, the brace member and tilt mechanism may be formed separately and then coupled together. In any event, the brace member is coupled to the tilt mechanism so as to prevent any pivoting movement of the brace member toward or away from the cutting zone. However, the brace member is configured to tilt along with the tilt mechanism relative to the base when the miter saw is adjusted for bevel cuts.

Pivot pin 108 is coupled to brace member 116 by a linkage assembly 118. As best seen in FIG. 5, one end of linkage assembly 118 includes a fork structure 120 pivotally coupled to a pivot pin 122 mounted in brace member 116. The opposite end of linkage assembly 118 includes a fork structure 124 pivotally coupled to each end of pivot pin 108. As shown, linkage assembly 118 is coupled to pivot pin 108 on either side of brake pawl 60. This provides increased stability and support when the brake pawl engages the blade. In an alternative embodiment, the linkage assembly may take the form of a pair of separate arms extending between pin 108 and pin 122 on either side of the brake pawl. As a further alternative, linkage assembly 118 may be configured to engage pivot pin 108 and/or pivot pin 122 on only a single side of the brake pawl. As another alternative embodiment, the linkage assembly may be configured to engage the center of pivot pin 108 (e.g., through a cut-out in the brake pawl) and/or the center of pivot pin 122 (e.g., through a cut-out in brace member 116).

In any event, the linkage assembly pivots relative to brace member 116 as the housing is pivoted toward and away from the cutting zone. Brace member 116 pushes or pulls pivot pin 108 and brake pawl 60 around the perimeter of the blade in first set of channels 110 as the housing is raised or lowered. Thus, the brake pawl is maintained at a constant distance from the brace member regardless of the position of the housing.

In response to an activation signal from a control subsystem (not shown), brake pawl 60 is pivoted into the teeth of blade 40. When the brake pawl engages the blade the angular momentum of the blade produces a force on the brake pawl that tends to urge the brake pawl to move in a clockwise direction along first set of channels 110. In other words, at least a portion of the angular momentum of the blade is transferred to the brake pawl. The force on brake pawl 60 is transferred to brace member 116 by linkage assembly 118. Linkage assembly 118 may be constructed of any relatively rigid material adapted to support brake pawl 60 during braking of the blade, including metal, plastic, etc.

Brace member 116 prevents the brake pawl from sliding clockwise within first set of channels 110 unless housing 102 pivots upward away from the cutting zone. As a result, pivot arm assembly 100 will be urged upward by engagement of the brake pawl with the blade. The amount of upward force on the blade will depend, at least partially, on the length of brace member 116. As the length of the brace member is increased, the upward force on the blade during braking will likewise increase. Typically, the length of the brace member is selected so that the upward force on the blade during braking is sufficient to stop any downward motion of the housing under normal operating conditions (i.e., the housing is pivoted downward toward the cutting zone at a normal speed). Optionally, the length of the brace member is selected so that the upward force on the blade during braking is sufficient to overcome and reverse any normal downward momentum of the housing and blade, thereby retracting the blade upward away from cutting zone 96.

In any event, brake pawl 60 is arranged and supported to convert at least a portion of the kinetic energy of the rotating blade into an upward force on the blade and housing. Thus, exemplary brake mechanism 28 is configured to stop both the rotation of the blade and any downward movement of the blade using a single brake pawl. As a result, only a single cartridge or brake pawl need be replaced after the brake mechanism has been triggered.

Since the upward force on the blade and housing is produced by the rapid deceleration of the blade by the brake pawl, the upward force is only temporary. Once the rotation of the blade has stopped, the housing is free to pivot toward or away from the cutting zone. Nevertheless, the blade will remain locked against further rotation until the cartridge is removed.

Housing 102 may include one or more sections 126 which may be removed or repositioned to allow installation and removal of the cartridge or brake pawl and actuator. Pivot pin 108 is typically removed by sliding it completely through the brake pawl. Positioning pin 112 may also be slid completely through the actuator and/or cartridge. Alternatively, positioning pin 112 may be dual spring-loaded pins which can be depressed to allow the cartridge to be installed and removed more easily. Optionally, housing 102 may include one or more removable covers adapted to cover one or both of the first and second set of channels during normal operation. It will be appreciated that housing 102 and the components of the brake mechanism may be configured in any of a variety of different ways to allow the brake mechanism to be easily replaced.

While one particular embodiment has been described above, many modifications and alterations are possible. For example, FIGS. 6-9 illustrate an alternative exemplary embodiment in which the brake mechanism includes a brake pawl support structure that pivots within the housing. As shown, the brake mechanism includes one or more radial support arms 128 adapted to support cartridge 80 at a constant radial distance and orientation about arbor 42. Support arms 128 are configured to pivot about the elongate central axis of arbor 42. Each arm includes an annular collar portion 130 configured to fit on and swing about one of a pair of support rings 132. One support ring 132 extends from the inner surface of housing 102, while the other support ring extends from motor assembly 16. Collar portions 130 may be retained on support rings 132 by ring clips 134 or any other suitable mechanism. It will be appreciated that support arms 128 may alternatively be coupled to pivot about the arbor in a variety of other ways such as are known to those of skill in the art.

Cartridge 80 is coupled to support arms 128 by a pivot pin 136 and a positioning pin 138. The pivot and positioning pins maintain the cartridge at a constant radial distance and orientation relative to the perimeter of the blade as support arms 128 pivot around the arbor. The support arms are coupled to a brace member 116 by one or more linkages 140. The rear end of each linkage 140 is pivotally coupled to brace member 116 by a pivot pin 142. The front end of each linkage is pivotally coupled to a different one of support arms 128 by one or more pivot pins 144. In the exemplary embodiment, pivot pins 144 are mounted in outwardly projecting shoulder regions 146 formed in each support arm 128. Shoulder regions 146 are configured to ensure pivot pins 144 and the front ends of linkages 140 remain above arbor 42 at all operable positions of pivot arm assembly 100.

In the exemplary embodiment, linkages 140 extend forward from brace member 116 through one or more holes 148 in the rear of housing 102. Therefore, housing 102 requires no arcuate channels for receiving pins 136, 138 or 144. Furthermore, linkages 140 should not interfere with standard blade guards (not shown) that typically cover the perimeter of the housing and blade. Indeed, a front section of housing 102 may optionally be constructed to telescope around the exterior of the remainder of the housing to allow a user to have greater access to the blade. Alternatively, linkages 140 may be disposed on the exterior of the housing, in which case pivot pin 136 and positioning pin 138 would extend through arcuate channels or similar openings in the housing. Although linkages 140 are depicted as separate structural elements, it will be appreciated that the linkages may be formed as an unitary member with spaced-apart arms, etc.

Figure 6:
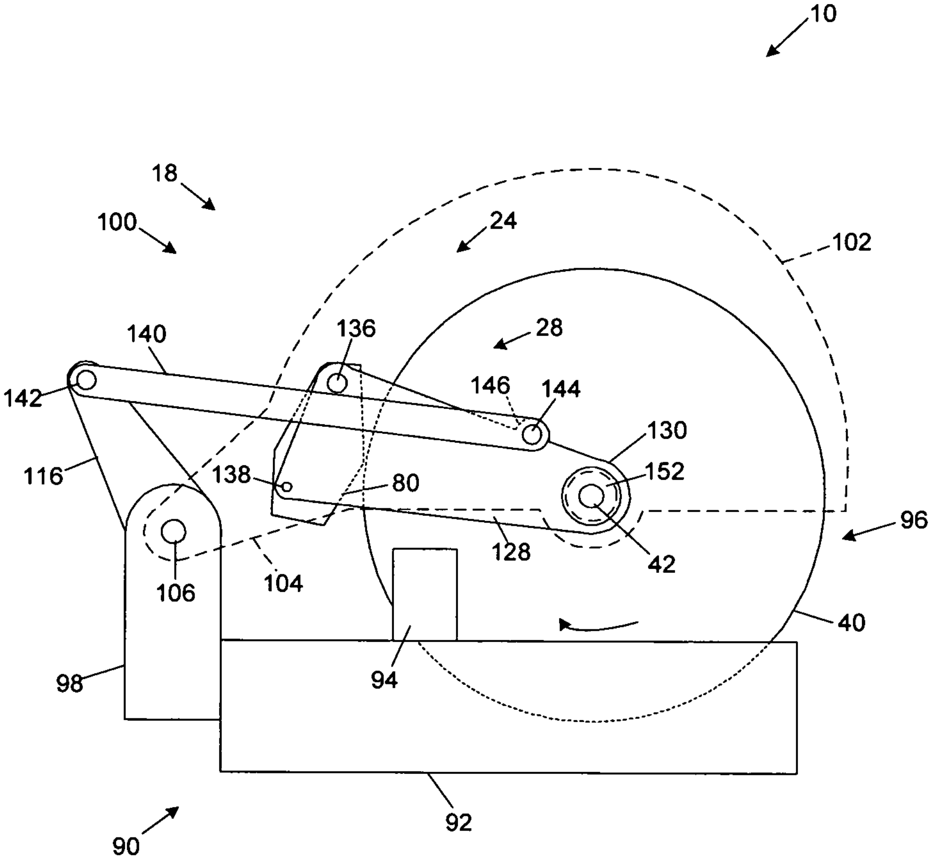
FIG. 6 is a schematic side elevation of another exemplary miter saw having an alternative safety system configured to stop both the rotation and downward movement of the blade.
Figure 7:
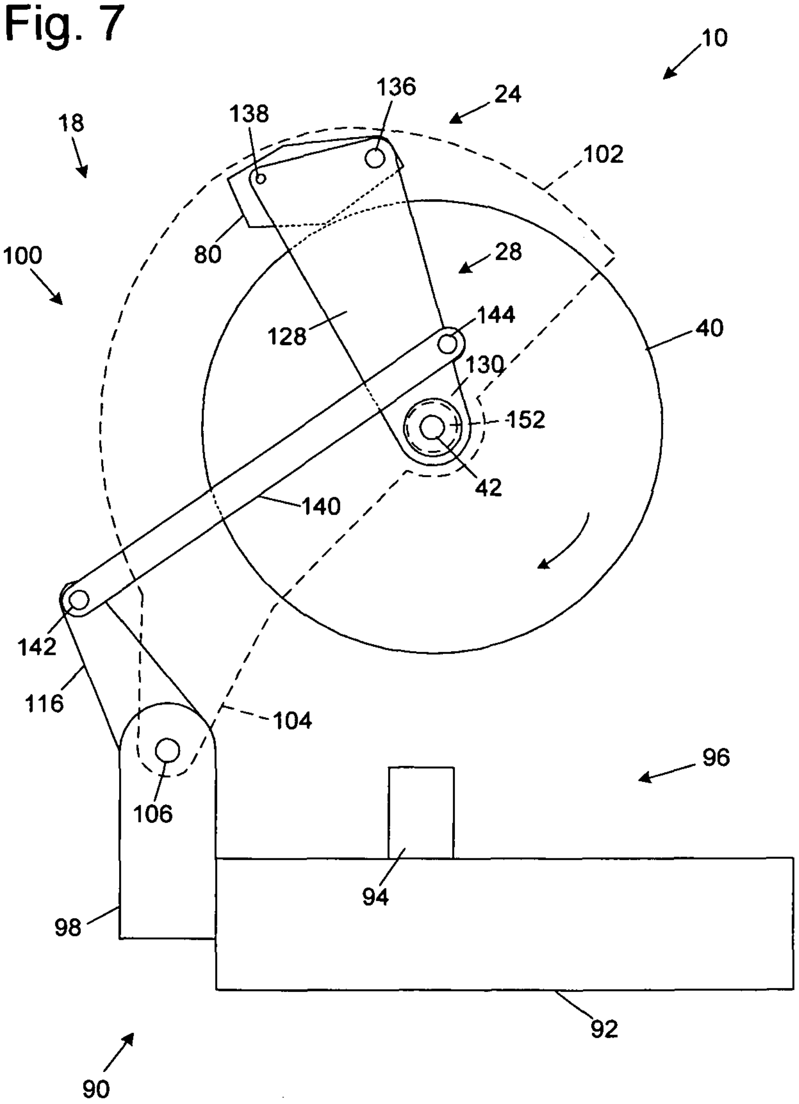
FIG. 7 is similar to FIG. 6 but shows the pivot arm assembly pivoted upward away from the cutting zone.
Figure 8:
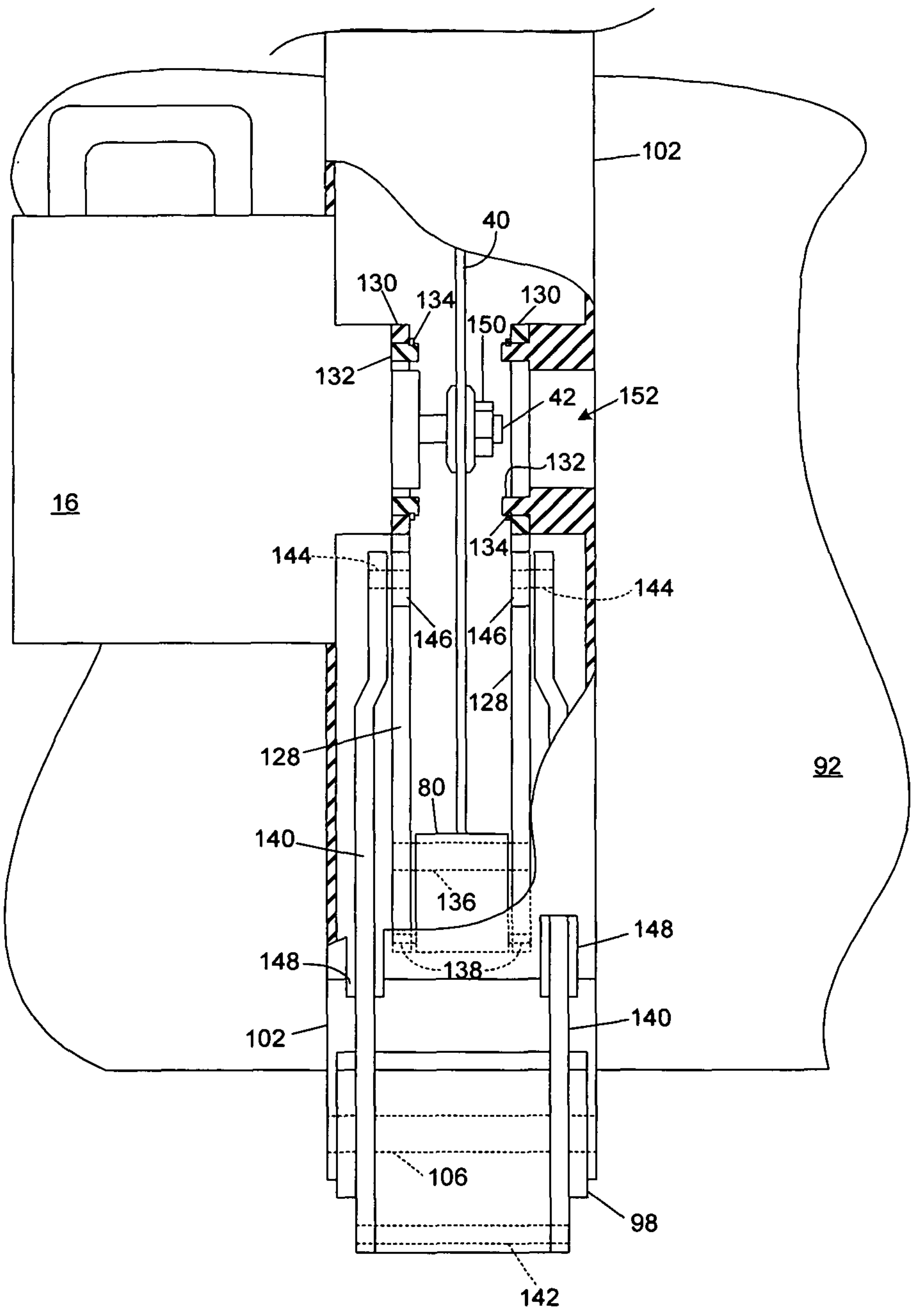
FIG. 8 is a partial top plan view of the miter saw of FIG. 6, with a portion of the housing cut away to show the brake mechanism.

Comparing FIGS. 6 and 7, it can be seen that as pivot arm assembly 100 pivots about pivot coupling 106, linkages 140 cause support arms 128 to pivot about arbor 42 in the opposite direction. Thus, cartridge 80 and brake pawl 60 are counter-pivotally coupled to the pivot arm assembly. As the pivot arm assembly and blade pivot in a clockwise direction (as seen in FIGS. 6 and 7) downward toward cutting zone 96, the cartridge and brake pawl pivot in a counter-clockwise direction about the arbor. Conversely, as the pivot arm assembly and blade pivot in a counter-clockwise direction (as seen in FIGS. 6 and 7) upward away from cutting zone 96, the cartridge and brake pawl pivot in a clockwise direction about the arbor.

The brake pawl (not shown) is mounted on pivot pin 136 to pivot into the teeth of blade 40 upon receipt of an activation signal by the cartridge. When the brake pawl engages the rotating blade, the angular momentum of the blade tends to force the brake pawl to move upward and forward in a clockwise direction (as seen in FIG. 6) about the arbor. Consequently, radial support arms 128 are urged to pivot in a clockwise direction (as seen in FIG. 6) about the arbor. Since the radial support arms are connected to brace member 116 by linkages 140, any clockwise force on the radial support arms is translated into a counter-clockwise force about pivot coupling 106 on housing 102. In other words, when the brake pawl engages the blade, the housing and blade are urged upward away from cutting zone 96.

It will be appreciated that the amount of upward force on the housing will depend on the specific arrangement of brace member 116, linkages 140 and radial support arms 128. The counter-clockwise force on support arms 128 due to any downward momentum and/or force on the pivot arm assembly will have a lesser moment than the clockwise force due to the brake pawl engaging the blade. This is because linkages 140 are coupled to the support arms at a radial position closer to the pivot point of the support arms than is the brake pawl. The ratio of the clockwise force-moment to the counter-clockwise force-moment will depend on the ratio of the distances between pivot pin 136 and arbor 42, and between pivot pins 144 and arbor 42. Additionally, the height of pivot pin 142 above pivot coupling 106, relative to the height of pivot pins 144 above arbor 42 will also effect the ratio of the upward force on the pivot arm assembly due to the brake pawl to any downward momentum and/or force on the pivot arm assembly.

Typically, the height of pivot pin 142 above pivot coupling 106, and the position of pivot pins 144 on support arms 128 are selected to ensure that, under normal operating conditions, any downward movement of the blade toward the cutting zone is stopped when the brake pawl engages the blade. Optionally, the height of pivot pin 142 above pivot coupling 106, and the position of pivot pins 144 on support arms 128 may be selected to ensure that the clockwise force-moment on the support arms is greater than the normal counter-clockwise force-moment when the brake pawl engages the blade. In such case, the blade is pushed or retracted upward and at least partially away from the cutting zone when a dangerous condition is detected such as contact between the user's body and the blade.

Figure 9:
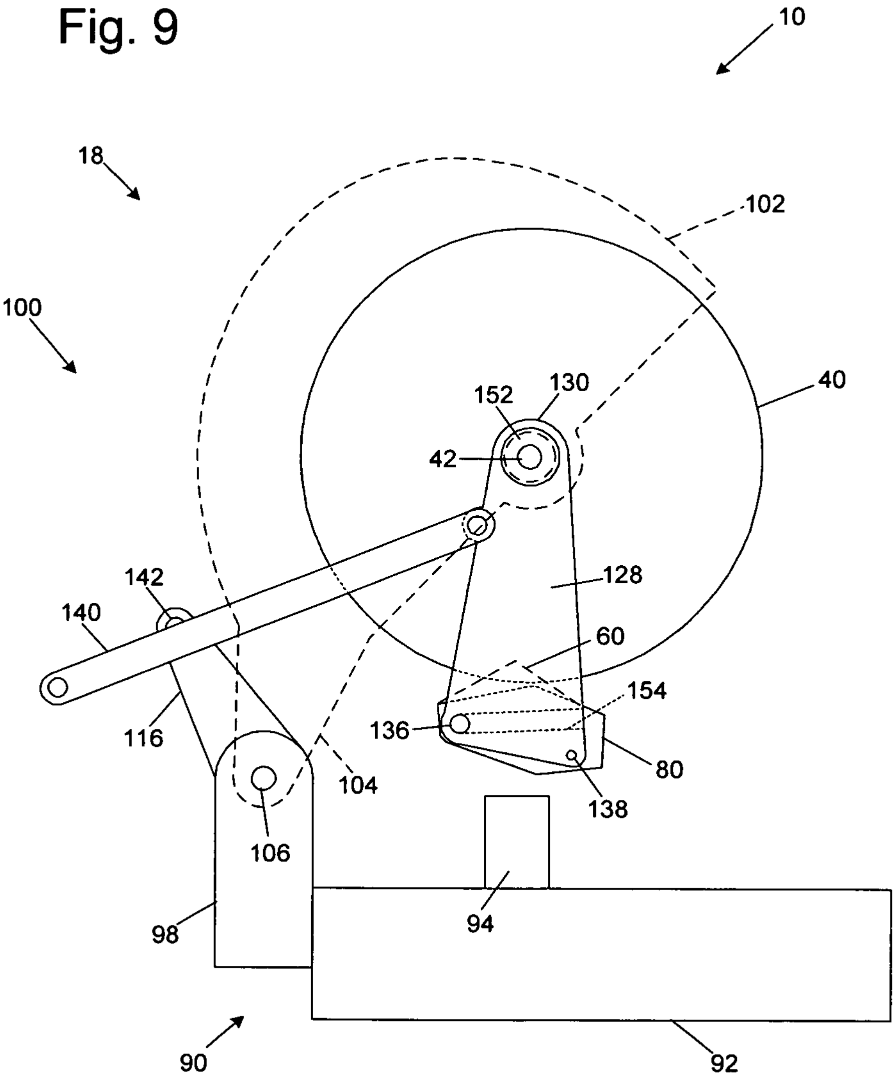
FIG. 9 is similar to FIG. 6 but shows the radial support arms uncoupled from the brace member to pivot the cartridge below the housing for replacement.

Once the brake pawl has engaged and stopped the blade, pivot arm assembly 100 is free to pivot about pivot coupling 106. Housing 102 may include a removable portion through which the cartridge can be replaced. Alternatively, the radial support arms may be uncoupled from brace member 116, as shown in FIG. 9. In the exemplary embodiment, the support arms are uncoupled from the brace member by disconnecting linkages 140 from pivot pin 142. Since the brake pawl usually is wedged onto the blade after being triggered, blade 40 may be rotated until the cartridge is exposed below the housing. Pivot pin 136 and positioning pin 138 may then be removed. Alternatively, positioning pin 138 may be dual spring-loaded pins which can be depressed to disengage the radial support arms. As further alternative, the interior surfaces of radial support arms 128 may include recessed channels 154 adapted to allow pivot pin 136 to slide into place. Position pin(s) 138 may then be installed to hold the cartridge in the operable position relative to the blade. After the used cartridge is replaced with a new cartridge, the cartridge and support arms are pivoted up into the housing and the linkages are reconnected to pivot pin 142. When removing or installing the blade, arbor nut 150 may be accessed through an opening 152 in the housing.

Figure 10:
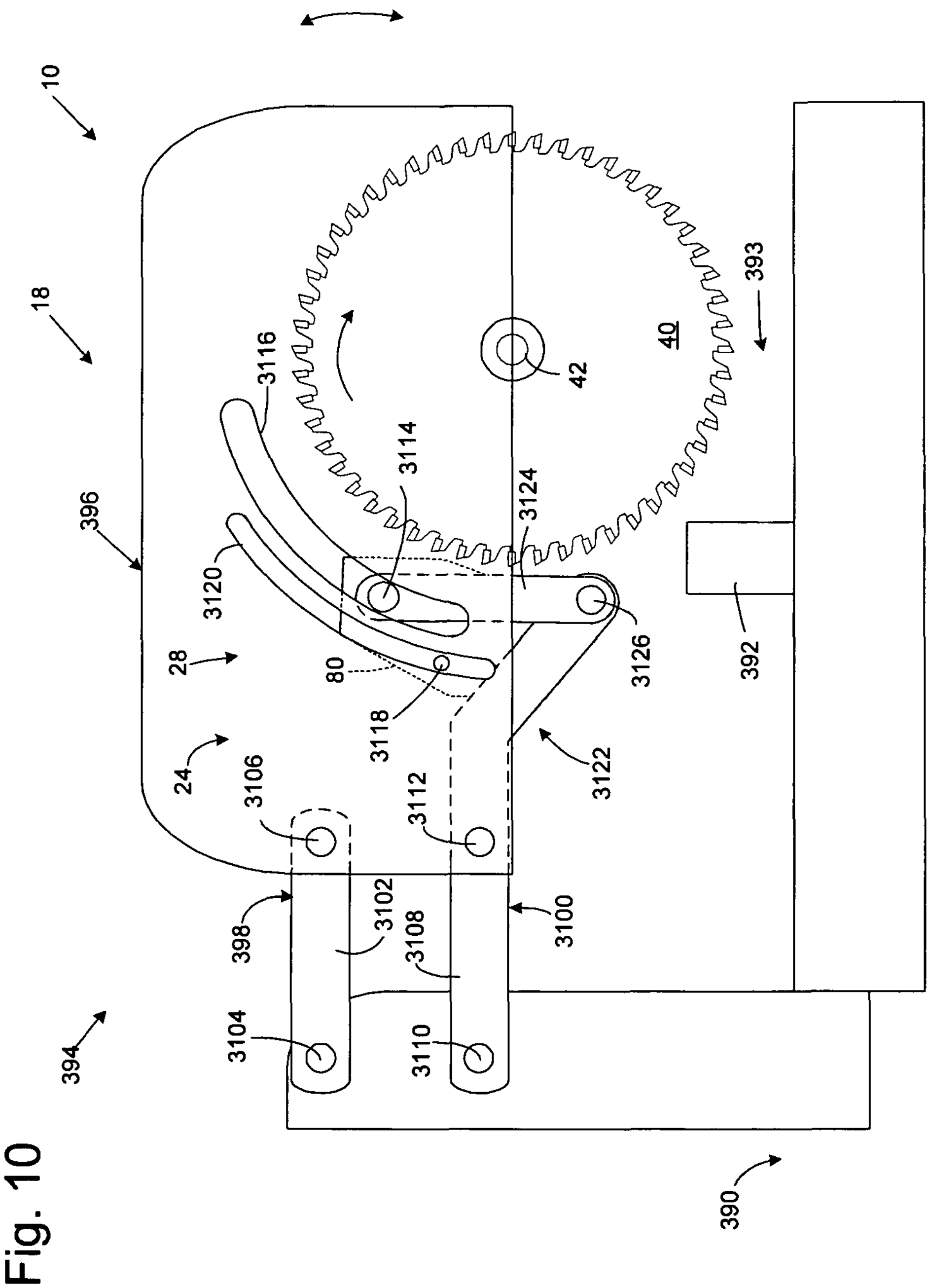
FIG. 10 is a schematic side elevation of another exemplary miter saw having a safety system configured to stop both the rotation and downward movement of the blade.
Figure 11:
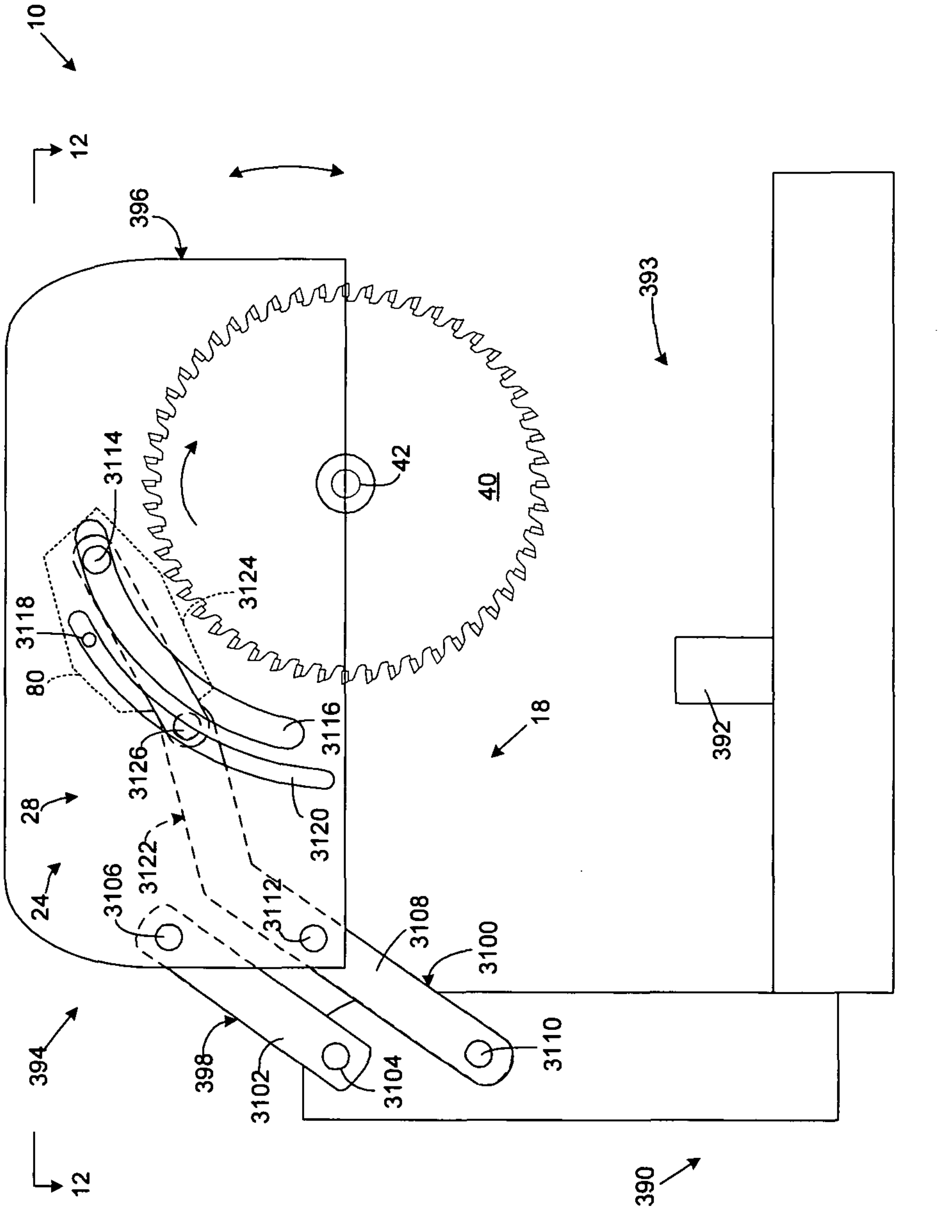
FIG. 11 is similar to FIG. 10 but shows the pivot arm assembly pivoted upward.
Figure 12:
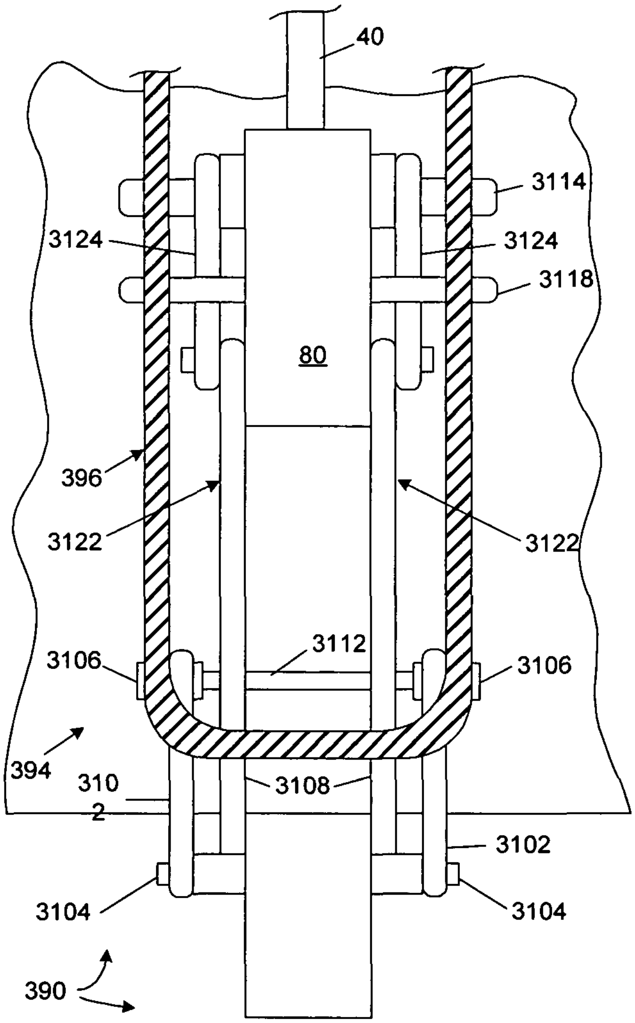
FIG. 12 is a schematic cross-sectional view taken generally along the line 12-12 in FIG. 11.

Turning attention now to FIGS. 10-13, another alternative embodiment is illustrated in which reaction subsystem 24 is configured to stop both the rotation and downward movement of blade 40. Exemplary miter saw 10 includes a base assembly 390 adapted to support a workpiece during cutting. Typically, one or more fences 392 are mounted on base assembly 390 and adapted to prevent workpieces from shifting across the base assembly during cutting. Base assembly 390 and fences 392 define a cutting zone 393 in which workpieces may be cut. The miter saw also includes a blade 40 mounted on an arbor 42. The arbor is driven by a motor assembly (not shown) which is supported above base assembly 390 by a pivot arm assembly 394. As shown in FIGS. 10 and 11, the pivot arm assembly is pivotal toward and away from cutting zone 393 to cut workpieces with the blade. In addition, some portion of the base assembly may be adjustable to tilt the blade relative to the workpiece to perform beveled cuts.

Pivot arm assembly 394 includes a housing 396 pivotally coupled to the base assembly by a first linkage assembly 398 and a second linkage assembly 3100 vertically spaced-apart from the first linkage assembly. First linkage assembly 398 includes a pair of elongate arms 3102 each connected at one end to one or more pivot pins 3104 mounted in the base assembly, and at the opposite end to one or more pivot pins 3106 mounted in housing 396. Similarly, second linkage assembly 3100 includes a pair of elongate arms 3108 each connected at one end to one or more pivot pins 3110 mounted in the base assembly. A generally central portion of each arm 3108 is connected to one or more pivot pins 3112 mounted in housing 396. Arms 3102 and 3108 may be constructed of any suitable material adapted to support the weight of the housing, motor assembly, blade, etc., including metal, plastic, etc. Typically, pivot arm assembly 394 includes a spring or other biasing mechanism (not shown) adapted to maintain the housing in a fully upward position away from cutting zone 393 when the miter saw is not in use.

As shown in FIGS. 10 and 11, pivot pins 3104 are vertically aligned with pivot pins 3110, while pivot pins 3106 are vertically aligned with pivot pins 3112. Additionally, the vertical spacing between pivot pins 3104 and 3110 is substantially equal to the vertical spacing between pivot pins 3106 and 3112. As a result, housing 396 pivots toward and away from cutting zone 393 while maintaining a constant orientation in relation to the base assembly. In other words, the first and second linkage assemblies are configured to pivot housing 396 without causing the housing to rotate relative to the base assembly.

Reaction subsystem 24 includes a brake mechanism 28 having at least one brake pawl 60 housed in a replaceable cartridge 80. The cartridge and brake pawl are mounted on a movable pivot pin 3114 configured to slide within a first set of channels 3116 in either side of housing 396. First channels 3116 define concentric arcs about arbor 42. As a result, pivot pin 3114 is maintained at a constant radius from the arbor as it slides within first channels 3116. A positioning pin 3118 extends from one or both sides of cartridge 80 to slide within a second set of channels 3120. The second set of channels also define concentric arcs about arbor 42 so that positioning pin 3118 maintains a constant radius from the arbor as it slides within the second set of channels. Since the brake pawl is housed in cartridge 80, both the cartridge and brake pawl are maintained in a constant orientation relative to the arbor and the perimeter of the blade as pivot pin 3114 slides within first channels 3116. Additionally, the cartridge and brake pawl tilt with the housing when the miter saw is adjusted to make bevel cuts.

Cartridge 80 typically includes a restraining mechanism adapted to hold the brake pawl away from the blade against the urging of a biasing mechanism. In response to an activation signal, a release mechanism releases the brake pawl from the restraining mechanism to pivot into the blade, usually stopping the blade within approximately 2-5 milliseconds. Exemplary restraining mechanisms, biasing mechanisms, release mechanisms, cartridges and brake pawls are described in more detail above and in the incorporated references. In alternative embodiments, the cartridge may be omitted.

Housing 396 may include a removable section through which the cartridge may be installed or removed. Pivot pin 3114 is typically removed by sliding it completely through the cartridge, thereby releasing the cartridge and brake pawl. Positioning pin 3118 may also be slid completely through the cartridge. Alternatively, positioning pin 3118 may be dual spring-loaded pins which can be depressed generally flush with the side of the cartridge to allow the cartridge to be installed and removed more easily. Optionally, housing 396 may include one or more removable covers adapted to cover one or both of the first and second set of channels during normal operation. It will be appreciated that cartridge 80 and housing 394 may be configured in any of a variety of different ways to allow the cartridge to be easily installed or removed.

Arms 3108 include distal portions 3122 spaced apart from pivot pins 3110 and extending toward blade 40. As housing 396 is pivoted downward toward the workpiece, distal portions 3122 pivot downward relative to the blade. Likewise, when housing 396 is pivoted upward away from the workpiece, distal portions 3122 pivot upward relative to the blade. Pivot pin 3114 is coupled to second linkage assembly 3100 by a pair of links 3124. The lower end of each link 3124 is coupled to the distal portion of one of arms 3108 by a pivot coupling 3126, while the upper end of each link is pivotally coupled to pivot pin 3114. Thus, pivot pin 3114 is pushed or pulled along first set of channels 3116 as distal portions 3122 pivot relative to the blade. Links 3124 may be constructed of any suitable material including metal, plastic, etc.

Figure 13:
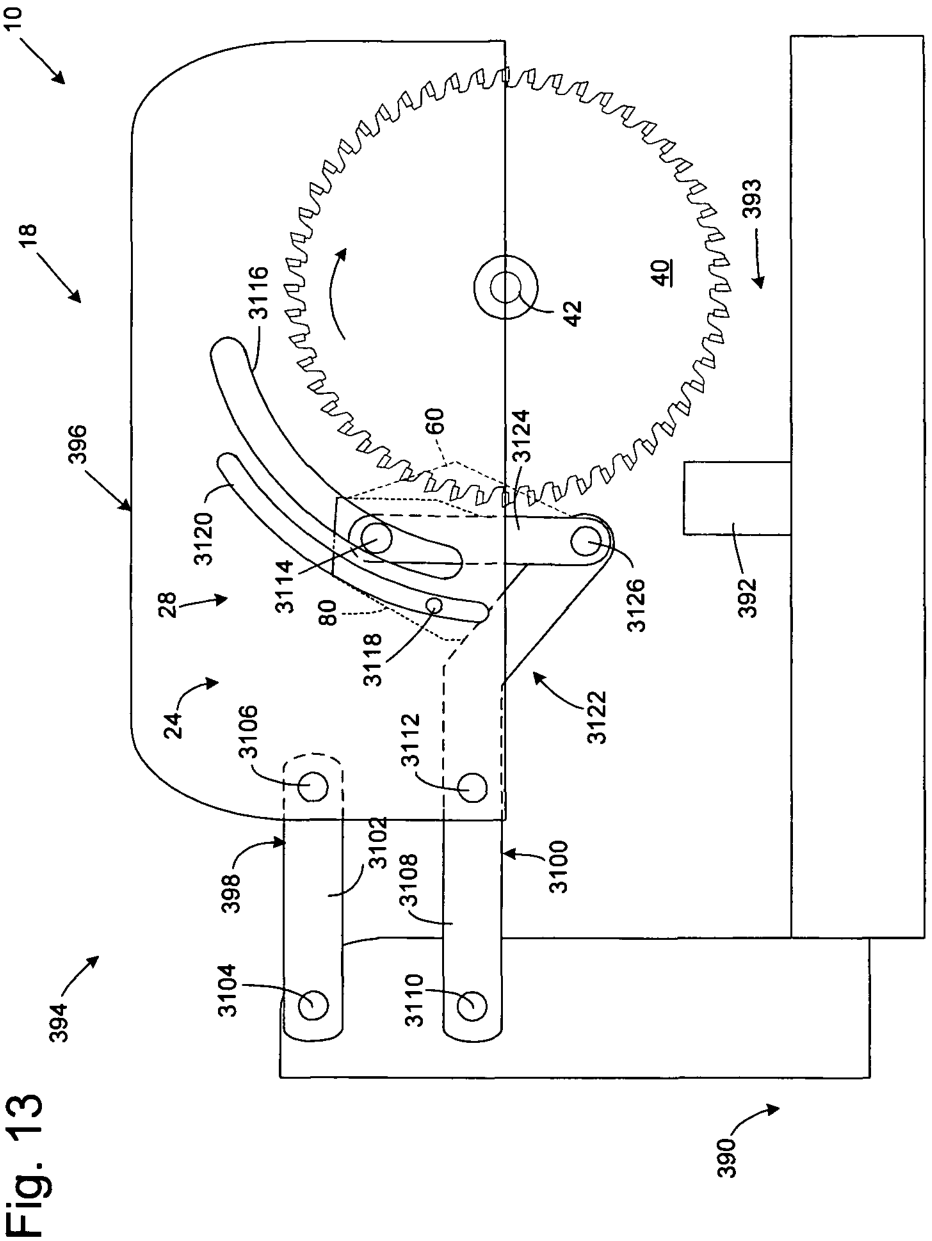
FIG. 13 is similar to FIG. 10 but shows the brake pawl engaging the blade.

As can be seen by comparing FIGS. 10 and 11, the cartridge and brake pawl pivot or revolve about the center of blade 40 as second linkage assembly 3100 pivots about pivot pin 3110. The cartridge and brake pawl also can be seen as pivoting around the center of the blade as housing 396 pivots toward and away from the workpiece. Moreover, the cartridge and brake pawl are configured to pivot in a direction counter to the pivot direction of second linkage assembly 3100 and housing 396. In other words, the cartridge and brake pawl pivot about the center of the blade in a counter-clockwise direction (as seen in FIG. 13) when the first linkage assembly and housing pivot about pivot pin 3110 in a clockwise direction. Conversely, the cartridge and brake pawl pivot about the center of the blade in a clockwise direction (as seen in FIG. 13) when the first linkage assembly and housing pivot about pivot pin 3110 in a counter-clockwise direction.

In response to an activation signal from a control subsystem (not shown), brake pawl 60 is pivoted into the teeth of blade 40, as shown in FIG. 13. When the brake pawl engages the blade the angular momentum of the blade produces a force on the brake pawl that tends to urge the brake pawl to move in a clockwise direction along first set of channels 3116. In other words, at least a portion of the angular momentum of the blade is transferred to the brake pawl. The force on brake pawl 60 is transferred to first linkage assembly 3100 by link 3124. As a result, distal portions 3122 are urged upward relative to the blade, thereby tending to pivot housing 396 in a counter-clockwise direction around pivot pin 3110 and away from cutting zone 393.

The amount of upward force on distal portion 3122 will depend on the ratio of the distance between couplings 3112 and 3126, and the distance between couplings 3110 and 3112. As the distance between couplings 3112 and 3126 is increased relative to the distance between couplings 3110 and 3112, the moment of any upward force at coupling 3126 is increased. Typically, couplings 3110, 3112 and 3126 are arranged so that the moment of the upward force on distal portion 3122 is sufficient to stop any downward movement of the housing and blade under normal operating conditions (i.e., the housing is pivoted downward toward the cutting zone at a normal speed). Optionally, the couplings may be arranged so that the moment of the upward force on distal portion 3122 is sufficient to overcome and reverse normal downward movement of the housing and blade, thereby retracting the blade upward away from cutting zone 393. In any event, brake pawl 60 is arranged to convert at least a portion of the kinetic energy of the rotating blade into an upward force on the housing and blade. Thus, exemplary brake mechanism 28 is configured to stop both rotation of the blade and any downward movement of the blade using a single brake pawl. As a result, only a single cartridge need be replaced after the reaction subsystem has been triggered.

Since the upward force on the housing is produced by the rapid deceleration of the blade, the upward force on the housing is only temporary. Once the rotation of the blade has stopped, the housing is free to pivot toward or away from the cutting zone. Nevertheless, the blade will remain locked against further rotation until the cartridge is removed.

It will be appreciated that while one particular embodiment has been described above, many modifications and alterations are possible. As one example, brake pawl 60 and cartridge 80 may be coupled to distal portions of first linkage assembly 398 rather than second linkage assembly 3100. As another example, second set of channels 3120 may be eliminated and positioning pin 3118 may be positioned on the cartridge to slide within the first set of channels 3116. As a further example, the first and/or second set of channels may be formed in only a single side of housing 396, in which case pivot pin 3114 and/or positioning pin 3118 extend through only a single side of the housing. In view of the many modifications and alterations which are possible, it will be understood that the scope of the invention is not limited to the particular embodiments described herein but includes all such modifications and alterations.

As described above, the present invention provides a miter saw which is substantially safer than existing saws. The miter saw includes a safety system 18 adapted to detect the occurrence of a dangerous condition and stop movement of the blade and/or the pivot arm to prevent serious injury to a user. Alternatively, the safety system may be adapted for use on a variety of other saws in addition to miter saws. Several examples of such modifications and variations, as well as further detailed descriptions of miter saws and other saws may be found in the following references, the disclosures of which are herein incorporated by reference: PCT Patent Application Serial No. PCT/US00/26812, filed Sep. 29, 2000; U.S. patent application Ser. No. 09/676,190, filed Sep. 29, 2000; U.S. Provisional Patent Application Ser. No. 60/275,595, filed Mar. 13, 2001; U.S. Provisional Patent Application Ser. No. 60/273,177, filed Mar. 2, 2001; U.S. Provisional Patent Application Ser. No. 60/233,459, filed Sep. 18, 2000; U.S. Provisional Patent Application Ser. No. 60/225,210, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; and U.S. Provisional Patent Application Ser. No. 60/157,340, filed Oct. 1, 1999.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A miter saw comprising:

a base assembly;

a housing pivotally coupled to the base assembly;

a circular blade supported at least partially within the housing;

a motor configured to rotate the blade; and a safety system including at least one brake member disposed within the housing and adapted to engage and stop the rotation of the blade;

where the brake member is coupled to the housing by a support structure configured to move the brake member within the housing and substantially circumferentially along the perimeter of the blade; and where the support structure is configured to move the brake member at least partially out of the housing to allow installation and removal of the brake member.

* * * * *